(12) United States Patent
Lühring et al.

(10) Patent No.: US 11,014,310 B2
(45) Date of Patent: May 25, 2021

(54) METHOD FOR CONNECTING TWO JOINING ELEMENTS

(71) Applicant: Fraunhofer-Gesellschaft zur Förderung der angewandten Forschung e.V., Munich (DE)

(72) Inventors: Andreas Lühring, Rastede (DE); Malte Kleemeier, Bremen (DE)

(73) Assignee: IONIC MATERIALS, INC., Woburn, MA (US)

( * ) Notice: Subject to any disclaimer, the term of this patent is extended or adjusted under 35 U.S.C. 154(b) by 74 days.

(21) Appl. No.: 16/087,492

(22) PCT Filed: Mar. 23, 2017

(86) PCT No.: PCT/EP2017/057003
§ 371 (c)(1),
(2) Date: Sep. 21, 2018

(87) PCT Pub. No.: WO2017/162829
PCT Pub. Date: Sep. 28, 2017

(65) Prior Publication Data
US 2019/0105847 A1   Apr. 11, 2019

(30) Foreign Application Priority Data
Mar. 24, 2016   (DE) .................. 102016205039.7

(51) Int. Cl.
*B29C 65/48* (2006.01)
*B29C 65/00* (2006.01)
(Continued)

(52) U.S. Cl.
CPC ........ *B29C 65/4835* (2013.01); *B29C 65/344* (2013.01); *B29C 65/348* (2013.01);
(Continued)

(58) Field of Classification Search
CPC .............. B29C 65/344; B29C 65/3444; B29C 65/3448; B29C 65/3492; B29C 65/3496;
(Continued)

(56) References Cited

U.S. PATENT DOCUMENTS

| 5,278,382 A | 1/1994 | Rische et al. |
| 5,500,510 A | 3/1996 | Kumagai |

(Continued)

FOREIGN PATENT DOCUMENTS

| DE | 1065052 B | 12/1966 |
| DE | 2154037 A | 5/1973 |

(Continued)

OTHER PUBLICATIONS

German Examination Report dated Nov. 11, 2016, from priority application DE 10 2016 205 039.7 filed on Mar. 24, 2016.
(Continued)

*Primary Examiner* — George R Koch
(74) *Attorney, Agent, or Firm* — Preti Flaherty Beliveau & Pachios LLP

(57) ABSTRACT

The present invention relates to a method for connecting two joining elements, these elements being connected by means of a thermally activatable adhesive with a flat heating element arranged therein, by suitable heating of the adhesive. The invention also relates to an assembly produced in this way from two joining elements and to an arrangement designed for carrying out a corresponding method.

13 Claims, 11 Drawing Sheets

(51) Int. Cl.
*B29C 65/82* (2006.01)
*C09J 5/06* (2006.01)
*F16B 11/00* (2006.01)
*B29C 65/34* (2006.01)
*B29C 65/50* (2006.01)
*B29C 65/78* (2006.01)
*C09J 163/00* (2006.01)

(52) U.S. Cl.
CPC ...... *B29C 65/3444* (2013.01); *B29C 65/3448* (2013.01); *B29C 65/3492* (2013.01); *B29C 65/3496* (2013.01); *B29C 65/4875* (2013.01); *B29C 65/5028* (2013.01); *B29C 65/5057* (2013.01); *B29C 65/5071* (2013.01); *B29C 65/7826* (2013.01); *B29C 65/8215* (2013.01); *B29C 66/1122* (2013.01); *B29C 66/43* (2013.01); *B29C 66/9192* (2013.01); *B29C 66/91211* (2013.01); *B29C 66/91231* (2013.01); *B29C 66/91317* (2013.01); *B29C 66/91421* (2013.01); *B29C 66/91651* (2013.01); *B29C 66/91951* (2013.01); *B29C 66/9592* (2013.01); *B29C 66/961* (2013.01); *C09J 5/06* (2013.01); *C09J 163/00* (2013.01); *F16B 11/006* (2013.01); *B29C 65/488* (2013.01); *B29C 65/4815* (2013.01); *B29C 66/7212* (2013.01); *B29C 66/91653* (2013.01); *B29C 66/91655* (2013.01); *C09J 2301/304* (2020.08); *C09J 2400/14* (2013.01); *C09J 2400/226* (2013.01); *C09J 2463/00* (2013.01)

(58) Field of Classification Search
CPC ............ B29C 65/4815; B29C 65/4835; B29C 65/4875; B29C 65/488; B29C 65/5028; B29C 65/5071; B29C 65/7826; B29C 65/8215; B29C 66/1122; B29C 66/43; B29C 66/7212; B29C 66/91211; B29C 66/91231; B29C 66/91317; B29C 66/91421; B29C 66/91651; B29C 66/91653; B29C 66/91655; B29C 66/9192; B29C 66/91951; B29C 66/9592; B29C 66/961; C09J 163/00; C09J 2201/61; C09J 2400/14; C09J 2400/226; C09J 2463/00; C09J 5/06; F16B 11/006
See application file for complete search history.

(56) References Cited

U.S. PATENT DOCUMENTS

| | | | |
|---|---|---|---|
| 5,575,869 A | 11/1996 | Fujiwara et al. | |
| 6,004,418 A * | 12/1999 | Ginman | B29B 13/023 |
| | | | 156/212 |
| 6,619,358 B2 | 9/2003 | Murphy | |

FOREIGN PATENT DOCUMENTS

| | | |
|---|---|---|
| DE | 3505115 A1 | 8/1986 |
| DE | 19725840 A1 | 1/1998 |
| DE | 102005026815 A1 | 12/2006 |
| EP | 0067621 A2 | 12/1982 |
| EP | 0128837 A1 | 12/1984 |
| JP | H09109263 A | 4/1997 |
| WO | 99/21694 A1 | 5/1999 |

OTHER PUBLICATIONS

International Search Report, dated Jun. 13, 2017, from counterpart application PCT/EP20171057003 filed on Mar. 23, 2017. In German.

The Written Opinion of the International Searching Authority, dated Jun. 13, 2017, from counterpart application PCT/EP2017/057003 filed on Mar. 23, 2017. In German.

English translation of the International Search Report, dated Jun. 13, 2017, from counterpart application PCT/EP2017/057003 filed on Mar. 23, 2017.

* cited by examiner

METHOD FOR CONNECTING TWO JOINING ELEMENTS

This application is a 371 of PCT/EP2017/057003, filing date Mar. 23, 2017.

The present invention relates to a method for connecting two joining elements, these elements being connected by means of a thermally activatable adhesive with a flat heating element arranged therein, by suitable heating of the adhesive. The invention also relates to an assembly produced in this way from two joining elements and to an arrangement designed for carrying out a corresponding method.

In industrial adhesion-based production, pre-applicable structural adhesives (PASA for short) are becoming increasingly important. They are thermoplastic materials that are solid at room temperature and can be cured by exposure to temperature to form chemically crosslinked plastics (thermosets). By choosing appropriate raw materials, the tackiness of the materials in the uncured state and the strength after curing can be adapted specifically to the requirements of the respective application. Usually, PASA materials consist of epoxy-based solid resins, thermoplastic polymers for impact modification and a latent catalyst system. The latter allows the adhesives to be stored well until they are used.

The particular advantage of PASA materials is that two elementary steps of adhesion-based production, the application of the adhesive and the curing, are separate from one another in space and time. It is thus possible in this way to produce precoated components, which can be passed on by the user directly to its production process. Because there is no longer any need for the application of adhesive, this means for the user that the process is simplified significantly. Thus, for example, procurement costs and operating costs for the application systems are saved, and there is also no longer any need to handle reactive adhesive systems, which often comprise hazardous substances.

Although, like customary structural adhesives, PASA can be cured by oven curing, they are especially suitable for rapid curing processes, in which the heat is only introduced locally in the region of the components to be joined. In this way, short curing times in the range of a few minutes or even seconds can be achieved, and surrounding, possibly temperature-sensitive structures are not adversely influenced.

According to the current state of the art, available as possibilities for rapid local heat input are inductive heating and heating by microwaves, infrared radiation or hot air. These techniques already allow a considerable energy saving in comparison with conventional oven curing, but the connected electrical load of commonly used microwave systems, infrared radiators and hot-air blowers is still in the range in the range of several kilowatts. Due to the relatively high energy demand and the often required associated need for active equipment cooling, this often results in a high space requirement or great weight, so that there is the difficult task of designing compact manual or robot-guided systems for local heating.

For reliable rapid curing of adhesives, it is desirable to have a temperature control with the greatest possible precision during the process. Normally, the curing is only at an optimum in a narrow temperature window, which, depending on the adhesive system used, lies between 100 and 250° C. If the temperature is below the optimum curing temperature, the adhesive connection is reduced in strength and resistance, while overheating of the adhesive causes it to suffer direct thermal degradation. Since high heating-up and cooling-down rates are used during rapid curing, strong temperature gradients necessarily occur between the adhesive and the components to be joined, so that the temperature in the adhesive must not be equated with the externally measurable component temperature. Although it is possible to deduce the temperature of the adhesive computationally from the component temperature, the necessary correction factors must be determined in laborious series of tests, and they can in each case only be applied to a specific combination of components and adhesive.

EP 0141065 B1 discloses a method for adhesively bonding metal parts by using a wire embedded in the adhesive. However, in the case of the setup described in this document, an exact temperature control is not possible, since the heating with a wire leads to linear heating, and also the temperature measurement only covers a linear region of the adhesive joint. It is not possible in this way to measure the temperature over the entire adhesive joint. Furthermore, EP 0141065 B1 relates to the use of adhesives with a strong exothermic reaction. This is required because the heating wire can only start the curing reaction of the adhesive in its direct vicinity, but is unable to bring an adhesive joint that extends over an area to the necessary curing temperature.

DE 2362247 A describes a heating element comprising a steel foil which is coated on both sides with a "temperature-sensitive" adhesive that can also cure chemically. Differentiated temperature control is not provided.

US 20030116282 describes fastening elements that can be attached to a component with the aid of an adhesive. The curing of the adhesive is accelerated by an electrical heating element incorporated in the adhesive layer. Application areas for fastening elements of this type include automobile construction and the space industry. The heating element used is described as a wire. The use of a linear heat source (heating wire) causes the disadvantages already described with respect to EP 0141065 B1. Here, too, effective temperature control is not described.

Figure 1:
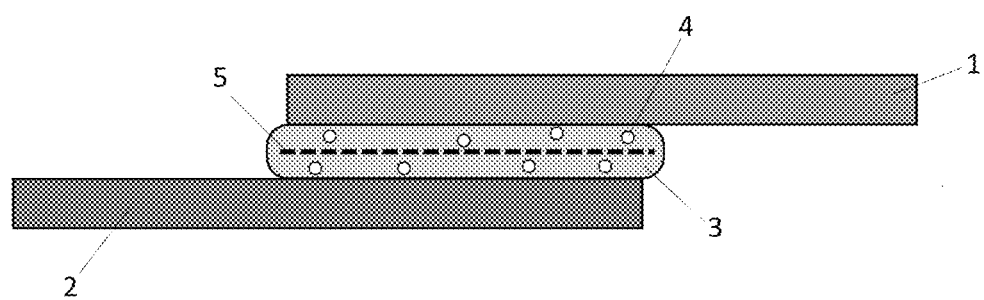
FIG. 1 is a schematic representation of an assembly comprising two joining elements, according to an embodiment of the invention.

Against the background of the prior art, the present invention has addressed the problem of providing a method with which reliable connection of two joining elements by means of a thermally activatable adhesive is ensured, while preferably as little energy as possible should be expended for the activation of the adhesive and while the method should preferably also be suitable for temperature-sensitive surfaces. In particular, it should be possible to avoid temperature peaks and it should be ensured that the temperatures required for optimum curing are obtained.

This problem is solved by a method for connecting two joining elements, comprising the steps of
a) providing the two joining elements,
b) providing a thermally activatable adhesive,
c) providing a flat heating element,
d) arranging the heating element in the adhesive,
e) arranging the heating element and the adhesive between the joining elements
f) heating the adhesive by applying electrical power to the heating element while at the same time measuring the temperature of the adhesive, the extent to which electrical power is applied to the heating element being controlled in dependence on the temperature measured.

A joining element in the context of the present invention is a (part-)object which is to be connected to a further (part-)object. In the case of part-objects, it may be that both joining elements belong to a single object, for example if a ring is to be formed.

A thermally activatable adhesive is an adhesive which only develops its adhesive effect by applying thermal energy. Preferably, a thermally activatable adhesive is one which is not active at room temperature (before applying thermal energy), which means that it has no adhesive effect or at most an adhesive effect of 10% compared with the adhesive effect after thermal activation, the adhesive effect being determined by the tensile lap-shear strength in accordance with DIN EN 1465.

A heating element in the context of the present invention is a device or a device part which is capable of giving off thermal energy. Preferably, an as element in the context of the present invention is one which is capable of converting electrical energy into thermal energy.

A flat heating element in the context of the present application is a heating element of which the extent in two spatial directions is greater by a factor of ≥4, preferably ≥40, particularly preferably ≥400, than in the third spatial direction. Furthermore, the ratio of the longest side to the second-longest side lies in the range from 1000:1 to 1:1. In this respect, a person skilled in the art will arrange the heating element in a suitable way.

According to the invention, the heating element is designed as a thin sheet-like formation. This means that the heating element to be used according to the invention is not a simple wire.

It is preferred in this connection that the heating element is a metal mesh, a metal foil, a graphite foil, a carbon fiber fabric or a blended carbon fiber/polymer fiber fabric, a structured graphite or metal foil, a foil with one or more slits or a sheet-like formation adapted to the bonding geometry.

Figure 3:
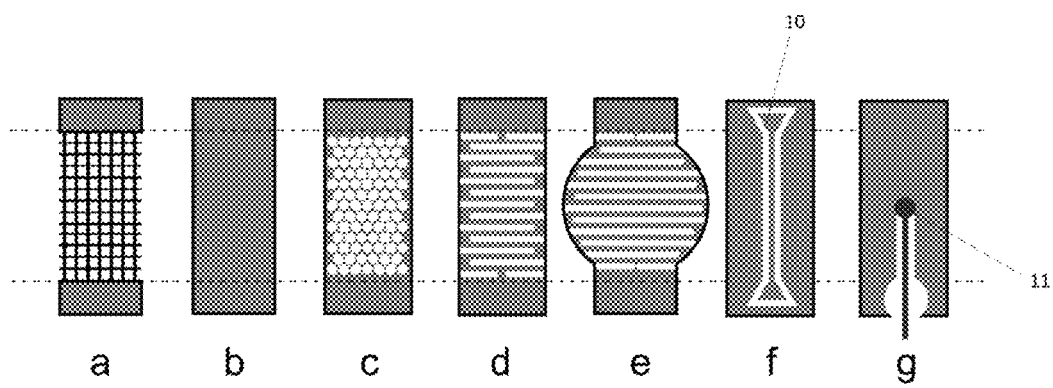
FIG. 3 shows schematically possible embodiments of the heating element to be used according to the invention.

Examples of foils according to the invention are schematically depicted in FIG. 3. This is referred to further below.

It is preferred that the flat heating element to be used according to the invention is arranged as far as possible in the middle of the thermally activatable adhesive.

Preferred thermally activatable adhesives (or else PASA materials) are solid in the non-activated state, in particular at room temperature. It is also preferred according to the invention that the adhesive to be used is a thermoset in the cured state.

Preferred adhesives in the context of the present invention are selected from the group consisting of epoxy resin adhesives, polyurethane and polyurea adhesives, silicone adhesives, polyacrylate adhesives and phenolic resins.

It is preferred in the context of the invention that the process of curing the adhesive used itself makes no appreciable contribution to the heating of the adhesive joint (i.e. less than 10% of the energy input during the curing originates from the curing reaction). This is achieved by a thin adhesive joint or by a low exothermy of the adhesive. As a result, a better temperature control is possible during the curing.

It is decisive for the present invention to measure the temperature as close as possible to the adhesive; this is possible in effect by the temperature of the heating element being measured. This corresponds to a measurement of the temperature of the adhesive in the context of the method according to the invention described above.

It is possible by the method according to the invention to cure adhesives in a short time with low energy expenditure in a reliable process. The flat heating element on the one hand serves however for heating the adhesive layer to the necessary curing temperature, on the other hand the measurement of the temperature of the heating element, and consequently directly of the surrounding adhesive, that is to say the measurement within the adhesive layer, allows the curing process to be controlled very precisely.

Figure 2:
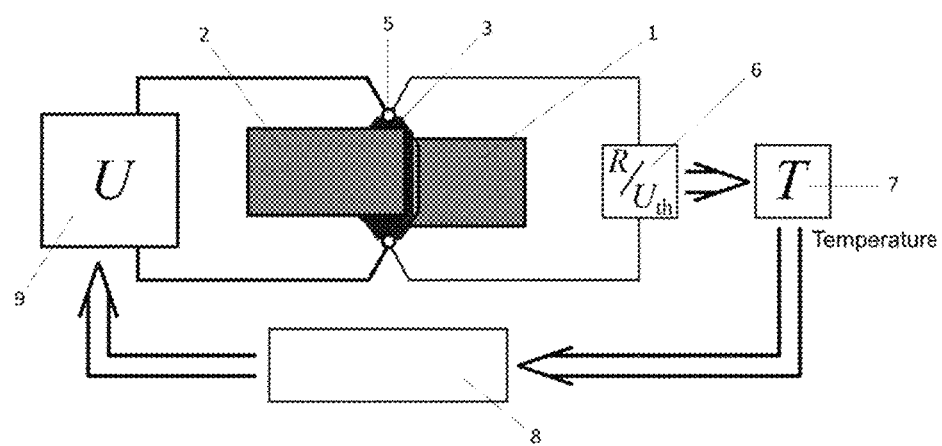
FIG. 2 is a schematic representation of a preferred method according to an embodiment of the invention.

This is schematically represented in FIG. 1 and FIG. 2. It is explained in still more detail further below.

It is preferred in the context of the invention that the measurement of the temperature of the adhesive is performed by determining the resistance of the heating element.

Also preferred in this respect is a method according to the invention where the resistance is determined by means of measuring the voltage and current intensity, with a time difference between the measurement of the current intensity and the measurement of the voltage of ≤10 ms, preferably ≤1 ms, more preferably ≤100 µs and particularly preferably ≤10 µs.

As an alternative according to the invention to the temperature measurement, it is possible to determine the temperature from a contact of two different metals in the heating element or by contact of a further metal with the heating element and using the thermoelectric voltage thereby produced, because the thermoelectric voltage is substantially proportional to the temperature.

Since the heat is introduced directly into the adhesive by means of the heating element, the heating takes place with maximum efficiency. For an adhesive connection with a typical cross-sectional area of several square centimeters, an electrical power consumption of only 10 to 100 W can be expected, depending on the heat dissipation capacity of the joining parts. After curing, the heating element remains in the adhesive joint once the method according to the invention has been carried out. Tests show, however, that bonding strengths that are sufficient for structural adhesive connections (≥10 MPa) can be achieved with the method.

The fact that—in particular in preferred methods according to the invention—the temperature of the heating element, and consequently of the adhesive surrounding the element, is measured in situ means that it is possible to ensure optimum control of the heating-up and heating process. This is possible in particular, and to be regarded as a preferred variant, if the electrical power that is applied to the heating element takes place in dependence on a time-temperature curve.

It is preferred in this respect that the control of the electrical power takes place with a maximum delay of ≤1000 ms, preferably ≤500 ms, more preferably ≤250 ms.

Preferably, the control of the electrical power is performed in dependence on a temperature-resistance dataset, which comprises data materially-geometrically specific to the heating element used.

The material-specific data may for example be determined by means of separate measurements of the resistance in dependence on the temperature, or possibly also taken from the specialist literature.

As already indicated above, it is preferred that the thermally activatable adhesive to be used is solid at room temperature. This makes it possible particularly well for the heating element that is to be used according to the invention to be incorporated permanently in the (not yet activated) adhesive. However, it is also possible in principle to use the heating element to be used according to the invention with a conventional adhesive in a liquid form, by the element being placed into the still liquid adhesive layer directly before the joining.

With a solid adhesive, it is additionally possible to prepare one of the joining elements (or even both joining elements) for joining, by the not yet activated adhesive, preferably already with an integrated flat heating element, being pre-applied in the form of a coating on the joining element, such as for example a bolt.

In this way, the end user obtains a high degree of functional integration (the component, adhesive and heat source for the curing form one unit), which then only has to be brought into contact with appropriate contacts for applying electrical energy for the heating, providing an easy and safe-to-handle solution for a production process.

Advantages of the method according to the invention, in particular in its preferred variants, are that an adhesive connection is created by particularly energy-conserving heating of the adhesive from the inside. At the same time, by parallel in situ measurement of the temperature, the energy supply can be controlled temperature-dependently, so that a narrow temperature corridor can be maintained during the heating up and heating of the adhesive. At the same time, the method according to the invention allows rapid activation by rapid heating, and consequently also rapid subsequent curing of the adhesive, while, as previously mentioned, the energy demand remains low.

It is preferred in this connection that the control of the electrical power is performed with a maximum delay of ≤1000 ms, preferably ≤500 ms and more preferably ≤250 ms.

It is possible by this fine control to maintain the temperature corridor particularly exactly.

The use of the flat heating element in this case brings about a good heat distribution in the adhesive to be activated. The fact that the heating element to be used is used at the same time as a sensor for the temperature of the adhesive means that the temperature value can be determined particularly exactly and offers an ideal basis for the control of the energy supply. In comparison with the conventional inductive curing of corresponding adhesive materials, which generally does without temperature detection and proceeds on the basis of a fixed time/power program, there is the possibility of carrying out readjustments at any time, and thus ensuring great reliability of the process and keeping the energy consumption low. By contrast, conventional curing of thermally activatable adhesives performed by inductive heating must take into account for each component geometry the corresponding component dimensions, the corresponding thermal conductivities and further substance- and situation-related measures, and so completely recreate the time/power program. Furthermore, with uncontrolled heating, it is necessary to work with safety factors, so that the maximum possible heating rates are not achieved.

As a result of the integration of the component, adhesive and heating element and simultaneous temperature measurement, the method according to the invention allows very high-speed joining of components with great reliability of the process. The slightly increased component costs due to the additional heating element are compensated by the lower investment requirement for the joining installation, reduced energy costs and faster cycle times.

Furthermore, the exact temperature control also makes a series of comparatively temperature-sensitive joining materials accessible, since the temperature control is thus ensured to be exact.

It may be preferred in the context of the invention that the power is not applied to the heating element by a battery charger with a current limiting circuit. Such a device is in need of improvement in terms of control accuracy, since no differentiated adjustment of the control is possible.

It is therefore preferred to use in the method according to the invention plastics and/or other non-metallic materials, in particular for joining elements selected from the group consisting of bolts, angles, plates, holders and fittings.

Also part of the invention is an assembly according to the invention comprising two joining elements that are produced or can be produced by the method according to the invention.

The invention also includes an arrangement designed for carrying out a method according to the invention, comprising (i) contacts for contacting a heating element for applying electrical power,
(ii) a thermally activatable adhesive in which a heating element is arranged and
(iii) a control unit for controlling the electrical power in dependence on the temperature of the adhesive.

The arrangement according to the invention may also comprise a hand-held apparatus which is capable of contacting the heating element and applying electrical energy.

There follow a series of suggestions for the method according to the invention:

FIG. 1 shows a schematic representation of an assembly according to the invention comprising two joining elements. The designations have the following meaning here:
1 joining element
2 joining element
3 thermally activatable adhesive
4 spacer (optional)
5 heating element As can be seen, it is possible, and in many cases preferred, that spacers are inserted into the thermally activatable adhesive. These have the function of ensuring a certain distance between the joining element 1 and the joining element 2, even for elastic activatable adhesives. Preferably, the spacers may take the following form: beads, fibers, fiber sections, woven fabrics, laid fabrics, filler particles of regular or irregular geometry. Preferably, the spacers consist of the materials glass, ceramic, minerals or polymer materials.

FIG. 2 shows a schematic representation of a preferred method according to the invention. In this case, the references mean
1 joining element
2 joining element
3 adhesive
5 flat heating element
6 resistance measuring unit
7 unit for determining the temperature
8 controller
9 control unit for the heating voltage The heating element 5 is formed as a thin sheet-like formation (mesh, fabric, foil) and is placed in the middle of the adhesive. It heats up as a result of its ohmic resistance when an electrical power is applied, the level of which in this case is controlled by means of the electrical voltage. The temperature measurement is performed by determining the resistance with the unit 6, which transfers the resistance data to the unit 7 for determining the temperature. The unit 7 for determining the temperature has material-specific data, by means of which the actual temperature in the heating element is determined in dependence on the resistance. The controller 8 is used to control the voltage, so that the heating is performed in a predetermined maximum/minimum temperature corridor in dependence on time.

The preferred adhesive material is solid at room temperature. It can be adapted to the planned application with respect to its hardness and tackiness in the uncured state by the choice of its composition. The same applies to the curing temperature and rate, and also to the achievable final strength. As a possible specific adaptation to the rapid curing process by the heating element embedded in the adhesive layer, the uniformity of the heating through of the adhesive can preferably be improved by the addition of thermally conductive fillers (for example alumina).

A number of different materials or material combinations come into consideration for the construction of the heating element. Some examples are shown in FIG. 3.

FIG. 3 shows possible embodiments of the heating element to be used according to the invention:
a) metal mesh or expanded metal
b) metal foil, graphite foil, carbon fiber fabric or blended carbon fiber/polymer fiber fabric
c) and d) structured graphite foil or metal foil
e) foil for adhesive connection of circular cross section (structured)
f) structured graphite or metal foil with separate sensor element (resistance sensor 10 on the inside)
g) a flat heating element, for example in the form of a metal foil; the temperature sensor is formed by a thermal contact between the metal foil and a wire 11.

In FIG. 3, the adhesive is applied on both sides within the region of the dashed line. The region outside serves for the electrical contacting.

Suitable in principle as the heating element are all materials with sufficient electrical conductivity. The optimum resistivity of the material is dictated by the area of overlap of the adhesive bond and the thickness of the heating element. For practical considerations, the resistance of the heating element should lie in the range from 100 mOhm to 1 kOhm. With lower resistances, the necessary heating power can only be achieved by high current intensities. This requires electrical supply leads of a great cross section and entails the risk of overheating at the electrical contact points. Conversely, high resistances require high voltages, with the associated shock hazard. Preferably coming into consideration as materials for the heating element are: stainless steel, constantan, graphite and carbon fibers. Other possible candidates are electrically conductive polymers or polymer-based material composites that have been made electrically conductive by the addition of fillers. A PASA material (thermally activatable adhesive) may also serve as a polymeric base.

The materials are preferably used as thin foils (FIG. 3b), woven fabrics or meshes (FIG. 3a). Meshes often have in comparison with foils of the same material a greater electrical resistance, which particularly in the case of materials with low resistivity may be of advantage. Furthermore, meshes are penetrated by the adhesive, and therefore do not act as much like a foreign body in the adhesive connection. Similar effects can also be achieved for metal foils if they are perforated (FIG. 3c) or structured in a meandering manner (FIGS. 3d and 3e).

The temperature measurement can preferably be realized with the aid of three different methods:
 1. By means of a resistance measurement, the heating element is used at the same time as a temperature sensor (FIGS. 3a-e).

The advantage of this solution is that particularly simply constructed, combined heating/sensor elements are obtained. However, in the case of heating elements with low resistance, the exact determination of the resistance, as is necessary for temperature measurement, can be difficult. Furthermore, certain materials, for example constantan, are excluded from this possibility, because the temperature coefficient of their electrical resistance is too low.
 2. The heating element and the sensor element are decoupled. The temperature is still determined from the resistance of the sensor element (FIG. 3f).
 3. The thermoelectric voltage at a material contact of two different metals (FIG. 3g) serves for the temperature measurement. One of the metals may be the material of the heating element (example: a heating element of constantan welded to a foil or a wire of nickel). The heating element and the thermocouple may however also be completely separated from one another.

Before the actual application, the adhesive and the heating element are preferably combined to form a unit. This can be achieved by pressing or rolling the adhesive material onto the heating element. When doing so, the heating element should preferably be positioned in the middle of the adhesive.

Preferred as the total thickness for the composite comprising the adhesive and the heating/sensor element are 0.25-1 mm. To fix a minimum adhesive layer thickness and to prevent contact between the joining part and the heating/sensor element in the case of metallic joining parts, spacers (for example glass beads) may be added to the adhesive.

The composite may either be used as a self-supporting film or it is precoated onto one of the parts to be joined.

For smaller components precoated with adhesive (for example bolts or other fastening elements), it is possible for a person skilled in the art to develop a compact device with which all of the steps of the adhesive bonding process mounting and positioning the components
temperature-controlled rapid curing
removal of contact points of the heating/sensor element projecting beyond the adhesive bond can be performed in one operation. By using lithium-ion batteries as the energy source, such an "adhesive gun" could be independently powered and then also be suitable for the craftsman or do-it-yourself sector.

EXAMPLES

Example 1

Determination of the Temperature Coefficient of the Electrical Resistance for a Stainless Steel Foil A stainless steel foil (steel: 1.4310, width: 12.7 mm, length: 25 mm, thickness: 0.01 mm) was provided with holes by analogy with FIG. 3c (hole diameter: 0.5 mm). The resistance of the foil was measured with the aid of a 4-wire measurement in the temperature range between room temperature and 200° C. The measuring device used (HP 34401A) had a resolution of 0.1 mOhm.

Figure 4:
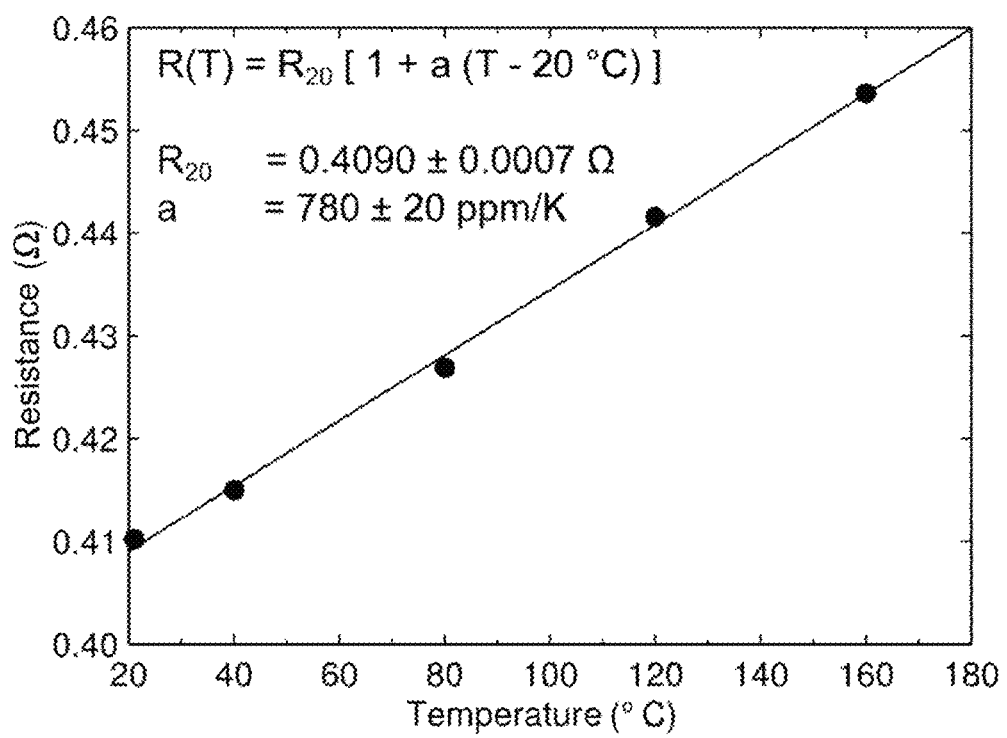
FIG. 4 is a graphical representation showing the measurement of the resistance of stainless steel foil in a temperature range of between 20° C. to 180° C. including a determination of the linear temperature coefficient of the electrical resistance, according to an embodiment of the invention.

By the measurement, the linear temperature coefficient of the electrical resistance was determined as 780±20 ppm/K (also compare FIG. 4: Change of the resistance of a stainless steel foil (steel: 1.4301) with temperature). With the given arrangement comprising the measuring device and the steel foil, a temperature measurement can therefore be carried out with an accuracy of ±3 K.

Example 2

Rapid Heating of a Test Arrangement Comprising a Heating Foil and PTFE Substrates A stainless steel foil as described in Example 1 was positioned between two sheets of PTFE ($25 \times 25 \times 4$ mm$^3$). In direct contact with the stainless steel foil was a thermocouple of type K for temperature detection. The foil was supplied with power by a controllable power supply unit (Delta Elektronika SM7020). The maximum current intensity was in this case limited to 7.5 A. For detecting the temperature and controlling the heating power, a controller developed at the Fraunhofer IFAM (IFAM IHC) was used.

For the rapid heating test, a setpoint temperature of $T_{set}$=180° C. was prescribed. Altogether, the temperature was recorded over a time period of 180 s, in which the heating was only activated in the first 60 s.

Figure 5A:
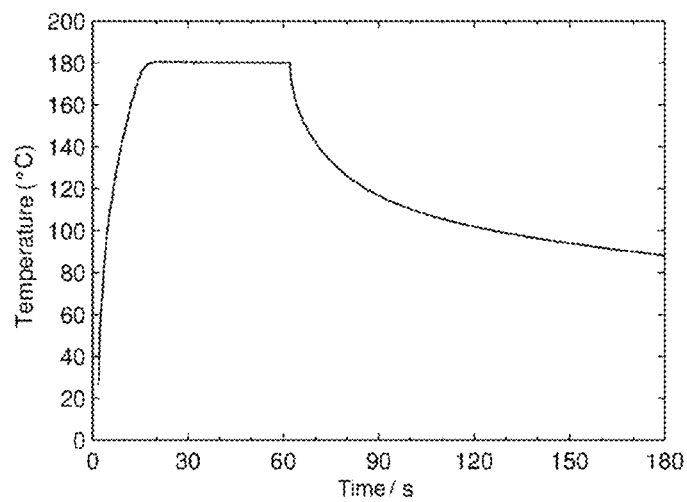
FIG. 5a is a graphical representation of a temperature curve over time during controlled heating up of a test arrangement, according to an embodiment of the invention.
Figure 5B:
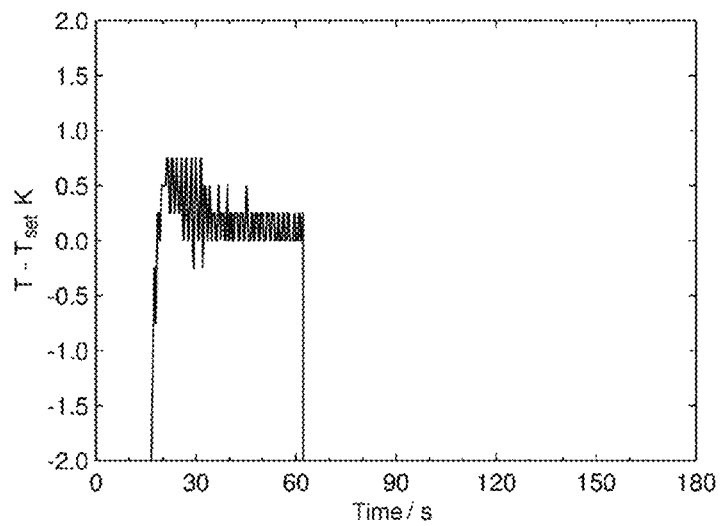
FIG. 5b is a graphical representation showing deviation of actual temperature from set point temperature over time during controlled heating up of a test arrangement, according to an embodiment of the invention.

In the test, the prescribed setpoint temperature was reached within 20 seconds, which corresponds to an average heating-up rate of about 8 K/s (compare FIG. 5a: Temperature curve during the controlled heating up of the test arrangement. The target temperature was at 180° C. After 60 seconds, the heating was switched off). A maximum heating power of about 20 W was applied to the stainless steel foil. In the steady-state phase of the test, the temperature was maintained with great accuracy (FIG. 5b: Deviations of the actual temperature from the setpoint temperature). The maximum deviation from the setpoint temperature was below 1 K.

Example 3

Rapid Curing of Adhesive Bonding Specimens (Temperature Control by Means of Thermocouple)

Figure 6:
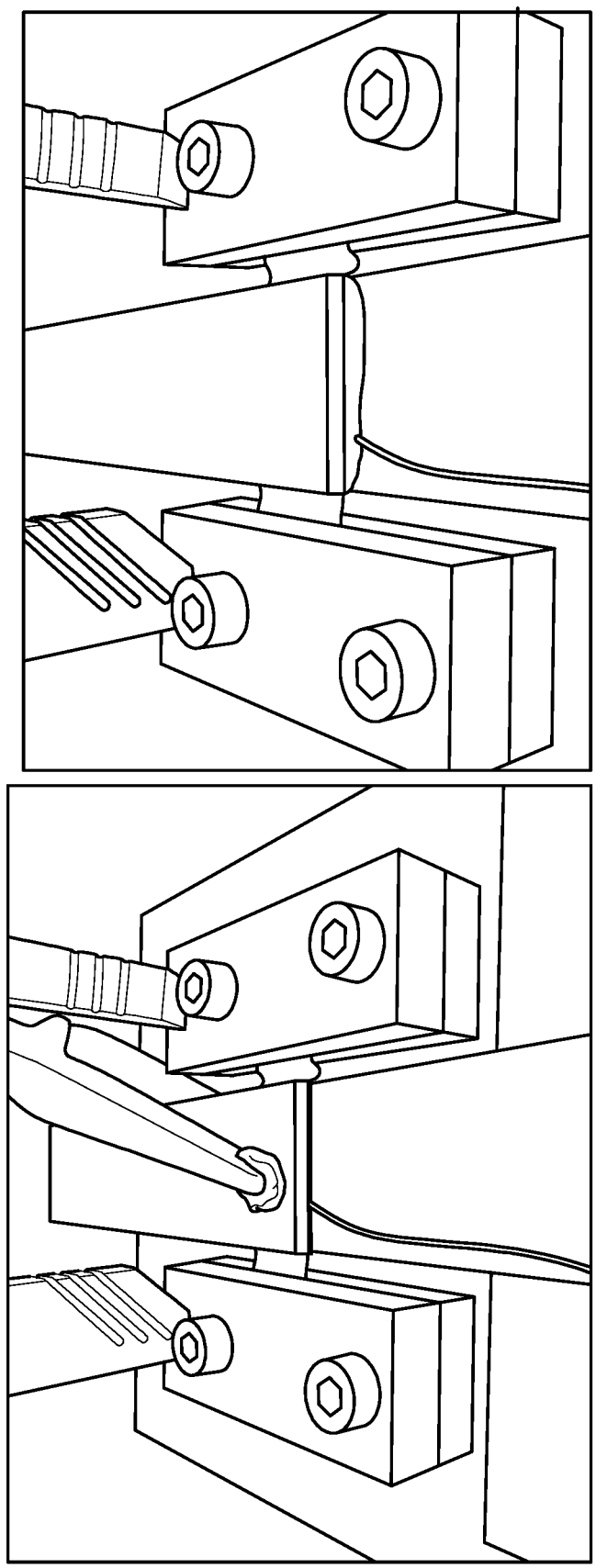
FIG. 6 shows a tensile lap-shear specimen before and after the rapid curing of the adhesive by electrical resistance heating, according to an embodiment of the invention.

Adhesive bonding specimens were produced with a tensile lap-shear geometry in accordance with DIN EN 1465. Substrates of glass-fiber reinforced epoxy resin (GRP) were used in each case for this. Serving as the adhesive was IFAM PASA-EH1, which at room temperature has the consistency of a plastic film with low tackiness. For the rapid curing, patches in the format $25 \times 12.5 \times 0.5$ mm$^3$ were produced from the adhesive with a perforated stainless steel foil and a thermocouple as the middle layer. As shown in FIG. 6 (tensile lap-shear specimen before and after the rapid curing of the adhesive by electrical resistance heating), these patches were placed in the overlapping region ($25 \times 12.5$ mm$^2$) of the GRP joining parts. Curing by resistance heating was performed in the same test arrangement and with the same temperature program as described in Example 2. As a control, tensile lap-shear specimens with the adhesive PASA EH1 were conventionally cured in a circulating-air oven without a heating/sensor element (30 minutes at 180° C.).

Figure 7A:
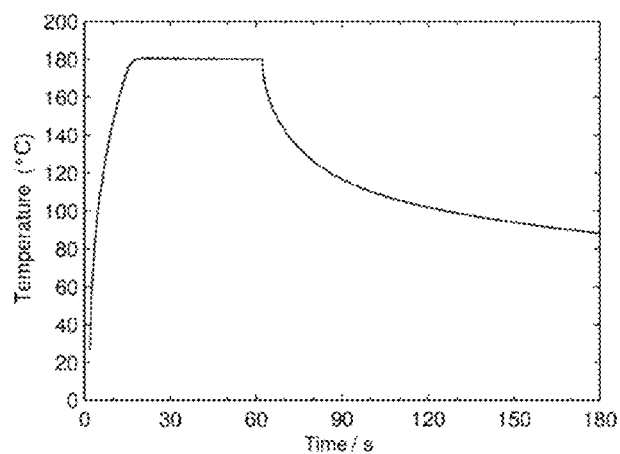
FIG. 7a is a graphical representation of a temperature profile during rapid curing of an adhesive PASA EH1 between GRP joining parts, according to an embodiment of the invention.
Figure 7B:
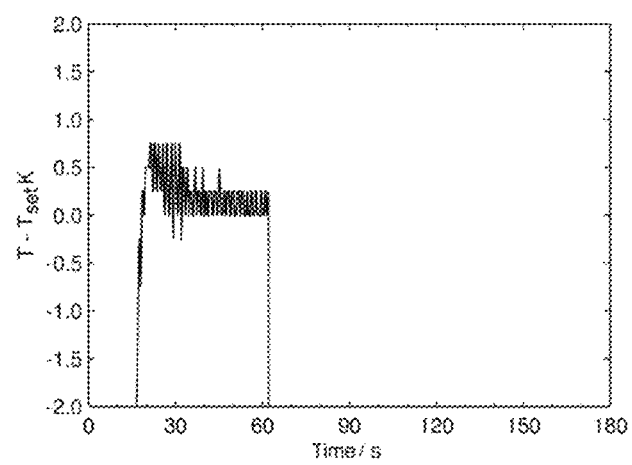
FIG. 7b is a graphical representation of the deviation from a set point temperature for rapidly cured adhesive PASA EH1 between GRP joining parts, according to an embodiment of the invention.

During the curing test, the setpoint temperature of 180° C. was likewise reached after about 20 seconds and was maintained during the steady-state phase of the curing cycle with an accuracy of ±1 K (FIG. 7a: Temperature profile during the rapid curing of the adhesive PASA EH1 between GRP joining parts, FIG. 7b: Deviation from the setpoint temperature (180° C.)). The heating first caused the adhesive to liquefy and partially come out of the bonding gap. After removing the tensile lap-shear specimen from the mount, the adhesive appeared to be completely cured. This also applies to the regions that had left the bonding gap, which are not in such intensive thermal contact with the heating element as the material in the bonding joint. Bubbling in the adhesive and outgassing of volatile components (smoke emission) only occurred to a very slight extent.

Figure 8:
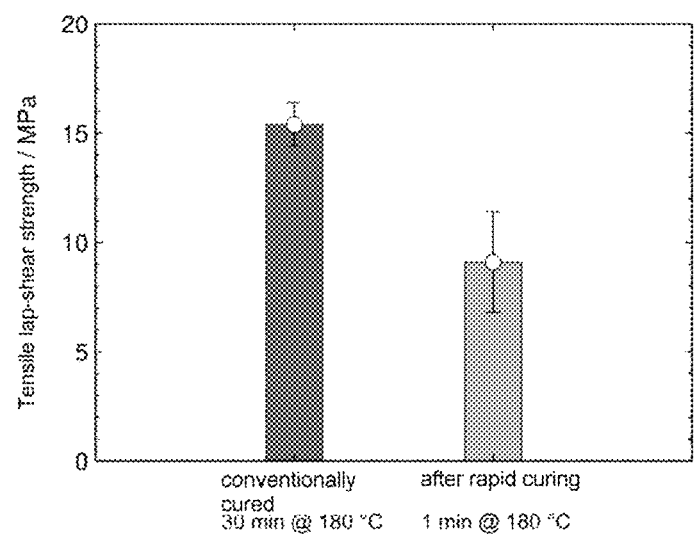
FIG. 8 is a graphical comparison of the tensile lap-shear strength of the adhesive PASA EH1 between GRP joining parts in an arrangement according to an embodiment of the invention after conventional and rapid curing.

With conventional oven curing, the adhesive achieved a tensile lap-shear strength of about 15 MPa (FIG. 8: Tensile lap-shear strength of the adhesive PASA EH1 between GRP joining parts after conventional and rapid curing). Although the strength of the specimens rapidly cured by electrical resistance heating was well below this value at about 10 MPa, the strength is already sufficient for many applications (even for structural connections). The reason for the reduced strength is probably not to be sought in the different curing conditions but in the fact that the temperature sensor used in the tests described weakens the structure of the adhesive joint due to a relatively thick supply lead wire (diameter about 0.5 mm). Better integration of the heating element and the sensor provides possibilities for improvement here.

Example 4

Rapid Curing of Two Different Adhesives (Temperature Control by Means of the Change in Resistance in the Heating Element)

The performance capability of rapid curing by means of resistance heating of the adhesive joint was to be demonstrated by the example of two adhesives with very different sets of properties:

Adhesive 1:

The adhesive AF 163_2U (3M) at room temperature takes the form of a flexible, substantially non-tacky film, which by heating first melts and thereby cures to form a thermosetting material. The adhesive represents a latent one-component system, i.e. the adhesive contains both an epoxy resin and the necessary catalyst in a premixed form. At normal ambient temperature, the curing only takes place very slowly (latency), so that at room temperature the adhesive film can be handled for several hours. On the other hand, it must be refrigerated at −18° C. for storing over longer time periods. The adhesive is intended for thermal curing (for example 90 minutes in the circulating-air oven at 120° C.).

Adhesive 2:

The adhesive EC 7256 (3M) cures already at room temperature after a short time when the two components have been mixed (processing time according to technical data sheet: 12 minutes, handling stability: about 80 minutes). The curing can be accelerated by heating.

GENERAL EXPERIMENTAL METHODS

The bonding strengths of adhesively bonded specimens were measured by tensile lap-shear tests in accordance with DIN EN 1465. For both adhesive systems, the strengths of specimens cured conventionally in ovens were compared with those of rapidly cured specimens.

Joining parts: glass-fiber reinforced epoxy (GRP) (100× 25 $mm^2$)

Preparation: superficial grinding of the joining parts, followed by cleaning with 2-propanol Oven curing: 2 hours at 120° C. in a circulating-air oven Tensile lap-shear testing at room temperature, testing rate: 10 mm/min, for every 5 test pieces Heating Element Used as the heating element for the electrical resistance heating of the adhesive joint was a laser-perforated stainless steel strip (alloy: 1.4310) with a thickness of 10 μm, analogous to FIG. 2c. The heating element has at room temperature a typical resistance of 0.5 Ohm. The heating element was embedded in the middle of the adhesive layers.

Measuring the Temperature in the Adhesive Joint by Means of the Resistance of the Heating Element The temperature dependence of the electrical resistance of the heating strip, which in the temperature range of interest is linear (cf. FIG. 4: Change of the resistance of a stainless steel foil (steel: 1.4301) with temperature) was used for measuring the temperature in the adhesive joint. The resistance measurement itself was performed by simultaneously measuring the voltage applied to the heating strip and the current flowing (cf. FIG. 1b), with the aid of two highly resolving 24-bit analog-digital converters. This ultimately allows a temperature measurement with an accuracy of about 1 K (Table 1).

TABLE 1

Characteristic values for the data acquisition of current, voltage, resistance of the heating element and temperature.

| | | |
|---|---|---|
| rms accuracy of voltage measurement | 100 | μV |
| rms accuracy of current measurement | 200 | μA |
| rms accuracy of resistance measurement | 300 | μOhm |
| rms accuracy of temperature measurement | 0.9 | K |
| Data sampling rate | 4 | Hz |

Temperature Control

Before the actual heating run, each heating element was individually calibrated against a thermocouple. This was a 1-point calibration at room temperature. The slope of the resistance characteristic of the heating element was determined in a previous measurement and then treated as a material constant applicable to each of the heating elements used.

The temperature measured by means of the heating element served as an input variable for a control circuit. A software PID controller, which activated a DC voltage source (maximum voltage: 5 V, maximum current 10 A), was used for the control.

A particular feature of the method used for temperature detection and control is that the base variables for the temperature measurement (current and voltage) are measured absolutely synchronously. This is important because, in the present arrangement, the heating element serves at the same time as a temperature sensor and changes of the current flow must not have any retroactive effects on the resistance measurement. If the detection of current and voltage were not synchronous, there would be excessive systematic errors in the resistance measurement and also in the temperature measurement. This applies in particular when there are rapid changes over time in the manipulated variable (i.e. the heating voltage), as are necessary for efficient and quick control.

Temperature Program for the Rapid Curing of the Adhesives

The temperature program for the adhesive curing comprised a rapid linear heating ramp, and an isothermal curing phase and subsequent cooling down without further energy input by the heating element. The parameters for the curing are compiled in Table 2.

TABLE 2

Temperature programs for rapid curing.

| | Heating ramp | Isothermal phase |
|---|---|---|
| Adhesive 1 | 30 K/s (duration <10 s) | 280° C. (duration 60 s) |
| Adhesive 2 | 20 K/s (duration <10 s) | 180° C. (duration 60 s) |

Carrying Out the Rapid Curing

The adhesive bonding device described in Example 3 was used for the mounting and electrical contacting. In order to obtain additional information about the heating through of the joining parts, a thermocouple of type K was attached on the surface of the joining parts in the region of the adhesive bond.

Results (Temperature Profile in the Adhesive Joint and at the Surface of the Joining Part)

Figure 9:
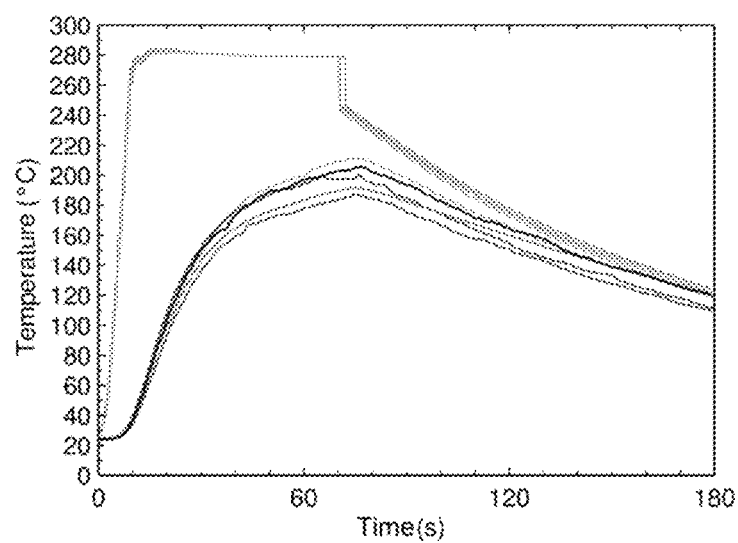
FIG. 9 shows a temperature/time diagram for 5 curing runs of the film adhesive AF 163_2U, according to an embodiment of the invention.
Figure 10:
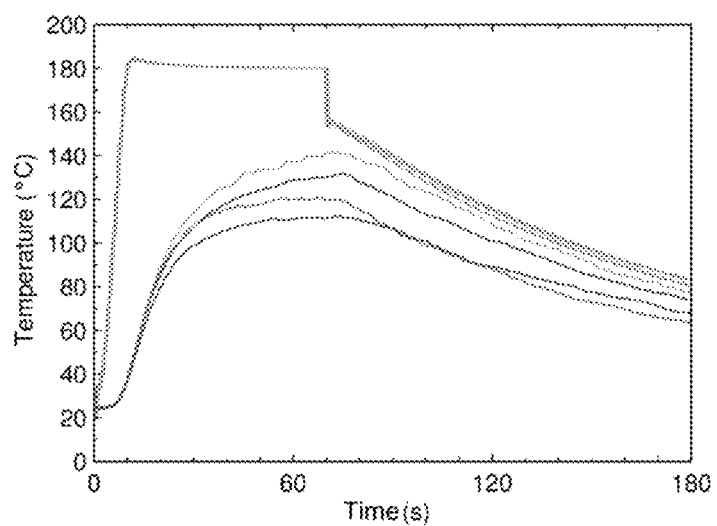
FIG. 10 shows a temperature/time diagram for 4 curing runs of the 2-component epoxy adhesive 3M Scotchweld EC 7256, according to an embodiment of the invention.

FIGS. 9 and 10 show the temperature profiles in the adhesive joint and on the surface of the joining part during the curing of the two model adhesives.

FIG. 9: Temperature/time diagram for 5 curing runs of the film adhesive AF 163_2U. The setpoint temperature for the curing of the adhesive was 280° C. Temperature curves shown as light were measured by means of the heating element in the middle of the adhesive layer, curves shown as dark were measured with the aid of a thermocouple on the surface of a joining part.

FIG. 10: Temperature/time diagram for 4 curing runs of the 2-component epoxy adhesive 3M Scotchweld EC 7256. The setpoint temperature for the curing of the adhesive was 180° C. Temperature curves shown as light were measured by means of the heating element in the middle of the adhesive layer, curves shown as dark were measured with the aid of a thermocouple on the surface of a joining part.

It is clearly evident how quickly the temperature signal from the adhesive joint reacts to the energy introduced by electrical resistance heating. The temperature on the surface of the joining part follows it with a significant time delay. For the control of rapid heating-up processes, direct temperature measurement in the adhesive joint is therefore ideal. By contrast, control by means of the surface temperature involves a significant dead time between the changing of the heating power and the temperature response. Therefore, control that relies only on the surface temperature of the joining parts is not advisable for rapid curing.

In the comparison of the curing runs for the various adhesive bonding specimens, it is found that the desired temperature profile is maintained very precisely and reproducibly. On the other hand, significant deviations occur in the surface temperature, attributable to the fact that the dissipation of heat to the surroundings is difficult to control (it is determined for example by the prevailing air flow). This problem is especially relevant in the case of high curing temperatures, because here there are great differences from the ambient temperature.

With slow cooling down of the specimens, the temperatures of the adhesive joint and the surface increasingly approach one another. This is also to be expected, because a temperature equalization takes place over time in the adhesively bonded specimen.

Results (Tensile Lap-Shear Testing of the Adhesive Bonding Specimens after Rapid Curing)

Figure 11:
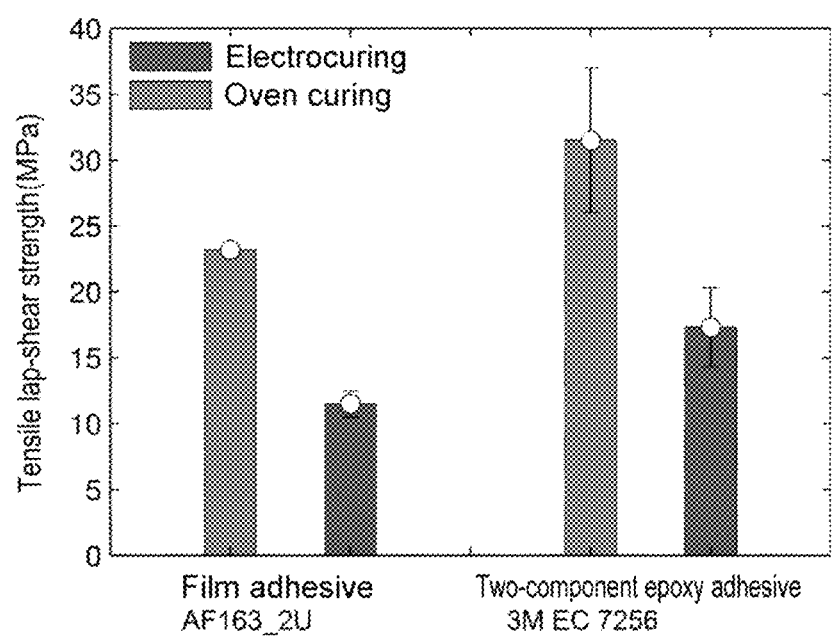
FIG. 11 is graphical comparison of the tensile lap-shear strength of film adhesive AF 163_2U and two-component epoxy adhesive EC 7256 after electro curing and after oven curing according to embodiments of the invention.

After conventional curing in a circulating-air oven, both model adhesives investigated achieved structural strengths that make them suitable for use in the construction sector. Adhesive 1 achieved a tensile lap-shear strengths of 23 MPa, adhesive 2 a strength of 33 MPa. In the latter case, the strength of the GRP substrate represented the limiting factor for the bonding strength (FIG. 11: Bonding strengths in the tensile lap-shear test of two different adhesive systems after conventional oven curing and after electrical rapid curing).

Under the conditions of rapid curing, adhesive connections are obtained with strengths which, though markedly below the conventionally cured specimens, at 11 MPa (adhesive 1) and 17 MPa (adhesive 2) are sufficient for many structural tasks.

The analysis of the fracture micrograph suggests that the loss of strength is at least partly caused by the inserted heating element. In the case of all the adhesive bonds, failure of adhesion with respect to the perforated stainless steel foil was observed. An improvement is probably still possible here, because the stainless steel foils used for the tests had not been specifically pretreated, and stainless steel without pre-treatment is considered to be a material that is difficult to bond adhesively.

In spite of the sometimes very high curing temperatures, the adhesive bonding specimens did not show any visible signs of decomposition of the adhesive or joining parts (discoloration or bubbling). This shows that, with the method used, very uniform and controlled heating of the adhesive layer is possible.

SUMMARY OF THE RESULTS

By controlled electrical resistance heating, it was possible to cure two different model adhesives within 70 seconds. The adhesives thereby achieved structural strengths of >10 MPa. The control allowed very high heating rates and reproducible maintenance of the prescribed temperature profile. The tests show that it is possible with the newly developed electronics for measurement data acquisition to use the heating element that is used for heating the adhesive layer at the same time as a precise and quickly responding temperature sensor. It is therefore possible to dispense with additional temperature sensors (for example thermocouples). In comparison with the temperature measurement on the surface of the parts to be joined corresponding to the prior art, the new method offers the advantage of a much shorter response time. This is the basic prerequisite for a controlled rapid curing of adhesives.

The invention claimed is:

1. A method for connecting two joining elements, comprising the steps of:
   a) providing the two joining elements,
   b) providing a thermally activatable adhesive,
   c) providing a flat heating element,
   d) embedding the flat heating element within the thermally activatable adhesive,
   e) arranging the flat heating element and the thermally activatable adhesive between the joining elements,
   f) heating the thermally activatable adhesive by applying electrical power to the flat heating element while at the same time measuring a temperature of the thermally activatable adhesive, the extent to which electrical power is applied to the flat heating element being controlled in dependence on the temperature measured, the measurement of the temperature of the thermally activatable adhesive being performed by determining a resistance of the flat heating element;
   wherein the resistance is determined by means of measuring synchronously a voltage and a current intensity, with a time difference between the measurement of the current intensity and the measurement of the voltage of ≤10 ms.

2. The method as claimed in claim 1, wherein the time difference between the measurement of the current intensity and the measurement of the voltage of is ≤100 µs.

3. The method as claimed in claim 1, wherein the control of the electrical power is performed in dependence on a temperature-resistance dataset, which comprises data materially and geometrically specific to the flat heating element used.

4. The method as claimed in claim 3, wherein the geometry-dependent characteristic data of the flat heating element required for a temperature calculation are determined by means of an automatic resistance measurement, before or during the heating.

5. The method as claimed in claim 1, wherein the control of the electrical power is performed in dependence on a time-temperature curve.

6. The method as claimed in claim 1, wherein the control of the electrical power takes place with a maximum delay of ≤1000 ms.

7. The method as claimed in claim 1, wherein the thermally activatable adhesive is solid in a non-activated state.

8. The method as claimed in claim 1, wherein the thermally activatable adhesive is a thermoset in a cured state.

9. The method as claimed in claim 1, wherein at least one of the joining elements, is a plastic or consists of other non-metallic materials.

10. The method as claimed in claim 1, wherein at least one joining element is selected from the group consisting of bolts, angles, plates, holders and fittings.

11. The method as claimed in claim 1, wherein the time difference between the measurement of the current intensity and the measurement of the voltage of is ≤10 µs.

12. The method as claimed in claim 1, wherein the control of the electrical power takes place with a maximum delay of ≤500 ms.

13. The method as claimed in claim 1, wherein the control of the electrical power takes place with a maximum delay of ≤250 ms.

* * * * *

UNITED STATES PATENT AND TRADEMARK OFFICE
CERTIFICATE OF CORRECTION

PATENT NO. : 11,014,310 B2
APPLICATION NO. : 16/087492
DATED : May 25, 2021
INVENTOR(S) : Andreas Lühring and Malte Kleemeier It is certified that error appears in the above-identified patent and that said Letters Patent is hereby corrected as shown below:

On the Title Page

Delete:
"(73) Assignee: IONIC MATERIALS, INC., Woburn, MA (US)"
Insert:
--(73) Assignee: FRAUNHOFER-GESELLSCHAFT ZUR FÖRDERUNG DER ANGEWANDTEN FORSCHUNG E.V., HANSASTRASSE 27 C, MÜNCHEN, GERMANY 80686--

Signed and Sealed this
First Day of November, 2022

Katherine Kelly Vidal
*Director of the United States Patent and Trademark Office*